United States Patent
Peddycord et al.

(10) Patent No.: US 6,502,655 B2
(45) Date of Patent: Jan. 7, 2003

(54) REAR CAB LATCH MECHANISM

(75) Inventors: Jeff Peddycord, Walnut Cove, NC (US); David Philipps, Kernersville, NC (US)

(73) Assignee: Volvo Trucks North America, Inc., Greensboro, NC (US)

( * ) Notice: Subject to any disclaimer, the term of this patent is extended or adjusted under 35 U.S.C. 154(b) by 78 days.

(21) Appl. No.: 09/826,631

(22) Filed: Apr. 5, 2001

(65) Prior Publication Data

US 2002/0144849 A1 Oct. 10, 2002

(51) Int. Cl.⁷ ............................................... B62D 33/06
(52) U.S. Cl. ................... 180/89.14; 180/69.21; 180/271
(58) Field of Search ................. 180/69.21, 69.2, 180/271, 89.14, 89.16, 89.17, 89.19; 296/190.04, 190.06

(56) References Cited

U.S. PATENT DOCUMENTS

| | | | | |
|---|---|---|---|---|
| 3,825,295 A | * | 7/1974 | Saunders et al. | 296/35 R |
| 3,930,681 A | * | 1/1976 | Burton et al. | 296/35 R |
| 3,944,017 A | * | 3/1976 | Foster | 180/89 A |
| 3,958,659 A | * | 5/1976 | Selman | 180/89 A |
| 4,082,342 A | * | 4/1978 | Allshie et al. | 296/28 C |
| 4,411,332 A | * | 10/1983 | Eichelsheim | 180/89.14 |
| 4,429,759 A | * | 2/1984 | Clark | 180/89.14 |
| 4,452,329 A | * | 6/1984 | Stone et al. | 180/89.15 |
| 4,509,612 A | * | 4/1985 | Stuart | 180/89.14 |
| 4,807,713 A | * | 2/1989 | Smith et al. | 180/89.14 |
| 5,209,316 A | * | 5/1993 | Bauer | 180/89.14 |
| 5,579,860 A | * | 12/1996 | Halverson et al. | 180/89.14 |
| 5,957,231 A | * | 9/1999 | Conaway et al. | 180/89.14 |
| 6,073,714 A | * | 6/2000 | McHorse et al. | 180/89.14 |

* cited by examiner

*Primary Examiner*—Eric Culbreth
*Assistant Examiner*—L. Lum
(74) *Attorney, Agent, or Firm*—Watts, Hoffmann, Fisher & Heinke Co., L.P.A.

(57) ABSTRACT

An over the highway vehicle having a forwardly pivotal cab mounted on a frame is disclosed. A latch assembly is interposed between the frame and the cab. The latch assembly includes coacting subassemblies including a catch for releasable retention by a latch. One of the subassemblies is connected to the frame and the other of the subassemblies is connected to the cab. The cab connected subassembly includes an impact absorbing yieldable element for normally maintaining a connected cab in a latched position. The element is extensible upon such vehicle experiencing a collision to allow controlled and limited forward tilting of the cab occasioned by the force of such a collision while maintaining the cab in a latched condition. A process of absorbing collision forces is also disclosed.

21 Claims, 3 Drawing Sheets

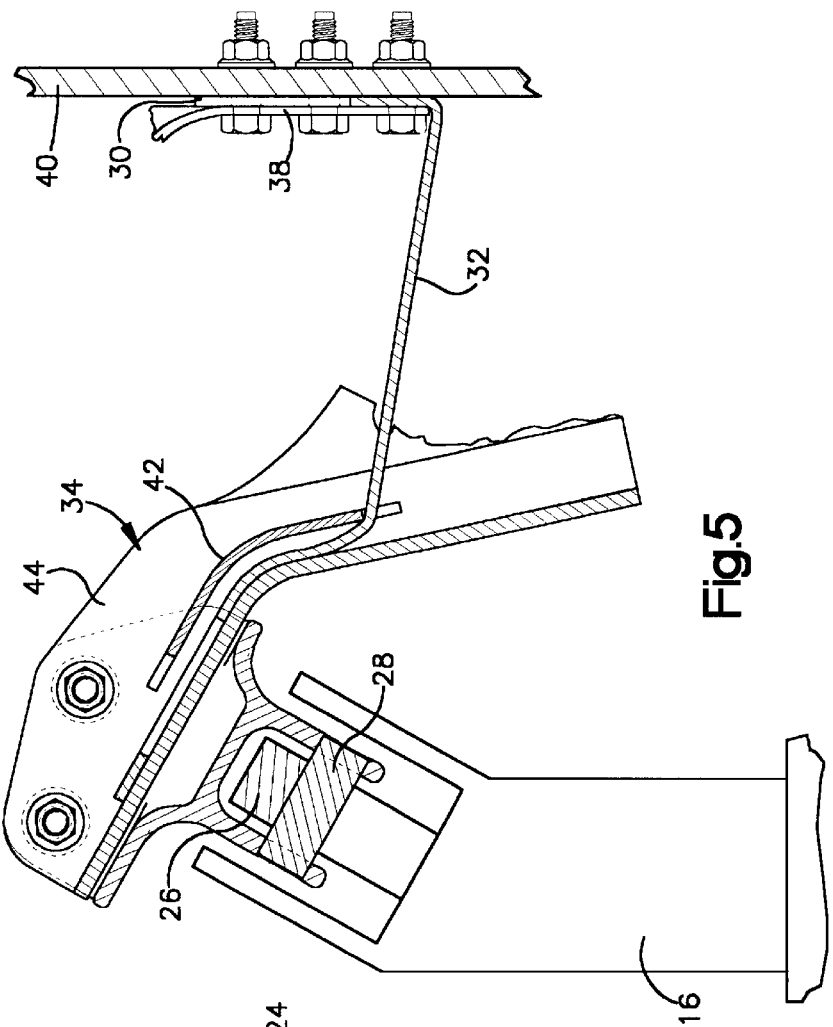
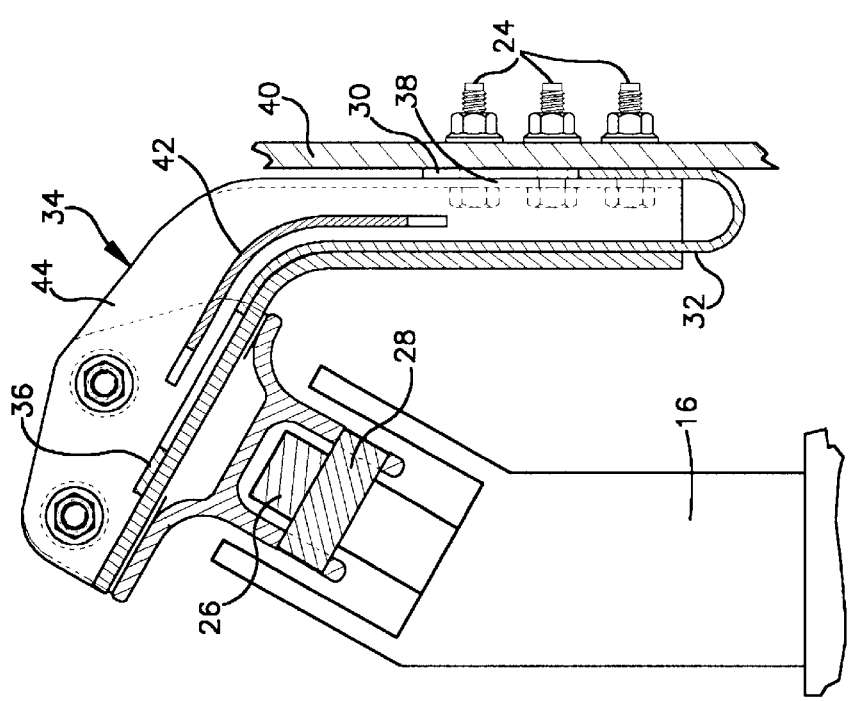

REAR CAB LATCH MECHANISM

TECHNICAL FIELD

This invention relates to a latching mechanism and more particularly to a latch assembly especially suited for securing a vehicle tiltable cab in an upright operating position.

BACKGROUND OF THE INVENTION

Cab-over-engine vehicles have been manufactured in quantity for at least half a century. An advantage of such vehicles, is that the overall length of a vehicle is reduced as compared to a so-called "conventional" cab behind engine vehicle. For over the highway hauling, cab over engine vehicles are advantageous where the vehicle is operated in jurisdictions where there are legal limits on the overall length of a vehicle. Such vehicles are also advantageous where maneuverability is important such as for intra-city deliveries.

At least in heavy duty vehicles, cab over engine vehicles are of the tilt cab type. That is, the cab is hingedly connected to a vehicle frame near the front of the vehicle, while the back of the cab is releasably latched to the frame.

Cab latches must be durable to withstand long vehicle life. They also must positively maintain a connection between the cab and the frame during vehicle operation. While such latches must maintain positive connections, prior latches which are satisfactory for the purpose, have had inherent drawbacks. If a latch mechanism fails to maintain a connection between the back of a cab and the frame during a collision, severe damage to the cab and a potential excessive injury to occupants can result. As a consequence, prior latches have been designed to maintain cab to frame connections even during severe collisions. While such positive connections are clearly more desirable than a latching mechanism which fails during a collision, a rigidly positioned cab will often experience excessive damage during a collision.

Accordingly, it would be desirable to provide a latching mechanism which is durable, which will maintain a cab to frame connection upon a collision, but yet is energy absorbing to minimize structural damage to the vehicle and injury to a vehicle occupant.

SUMMARY OF THE INVENTION

A cab latching mechanism made in accordance with the present invention, positively connects a cab to a frame in a reliable and durable manner. At the same time, the mechanism is designed to partially fail in a controlled manner while maintaining a cab to frame connection in the event of a collision. The partial failure absorbs impact energy minimizing damage to the vehicle. Tests have shown that while the unit partially fails and absorbs energy, it nonetheless meets and exceeds impact test requirements by maintaining a connection between the cab and the vehicle frame upon impact.

In the disclosed and preferred embodiment, a latch subassembly is fixed to a vehicle frame. This subassembly is known as a striker bracket. A coacting subassembly known as a hat section is connected to a cab. The hat section includes a catch which is retained by the latch during normal operation. The latch is of a conventional design which permits ready decoupling when a vehicle cab is to be tilted forwardly such as a for access to the vehicle engine for service.

The hat section includes main and frangible mounting brackets. The main mounting bracket includes a U-shaped tongue which in the preferred embodiment extends downwardly from a body of the main bracket that is secured to the cab. The tongue includes a U-shaped part so that the tongue includes an upstanding portion.

A channel is connected to and extends from the frangible bracket. An upper end of the tongue upstanding part is fixed, as by welding, to the channel. The catch is also fixed to the channel.

In the event of a collision of substantial force, the frangible bracket fails allowing the tongue to extend and increase its effective length as forces are absorbed. This allows the cab to tilt forwardly a relatively small amount as compared to the forward tilting to, for example, gain engine access. The tongue after extension is still connected to both the channel and the body of the main bracket so that the cab, while forwardly tilted a controlled amount, nonetheless is securely fastened to the frame by the latching assembly.

Accordingly, the objects of this invention are to provide a novel and improved energy absorbing latching system for a vehicle of the tilt cab type and a process of absorbing energy in the event of vehicle collisions.

BRIEF DESCRIPTION OF DRAWINGS

FIG. 4 is an enlarged view showing the catch subassembly and a latch member in cross-section;

FIG. 5 is a view corresponding to FIG. 4 except that it is showing the catch subassembly in its condition after it has absorbed an impact;

DETAILED DESCRIPTION OF THE PREFERRED EMBODIMENTS

Figure 1:
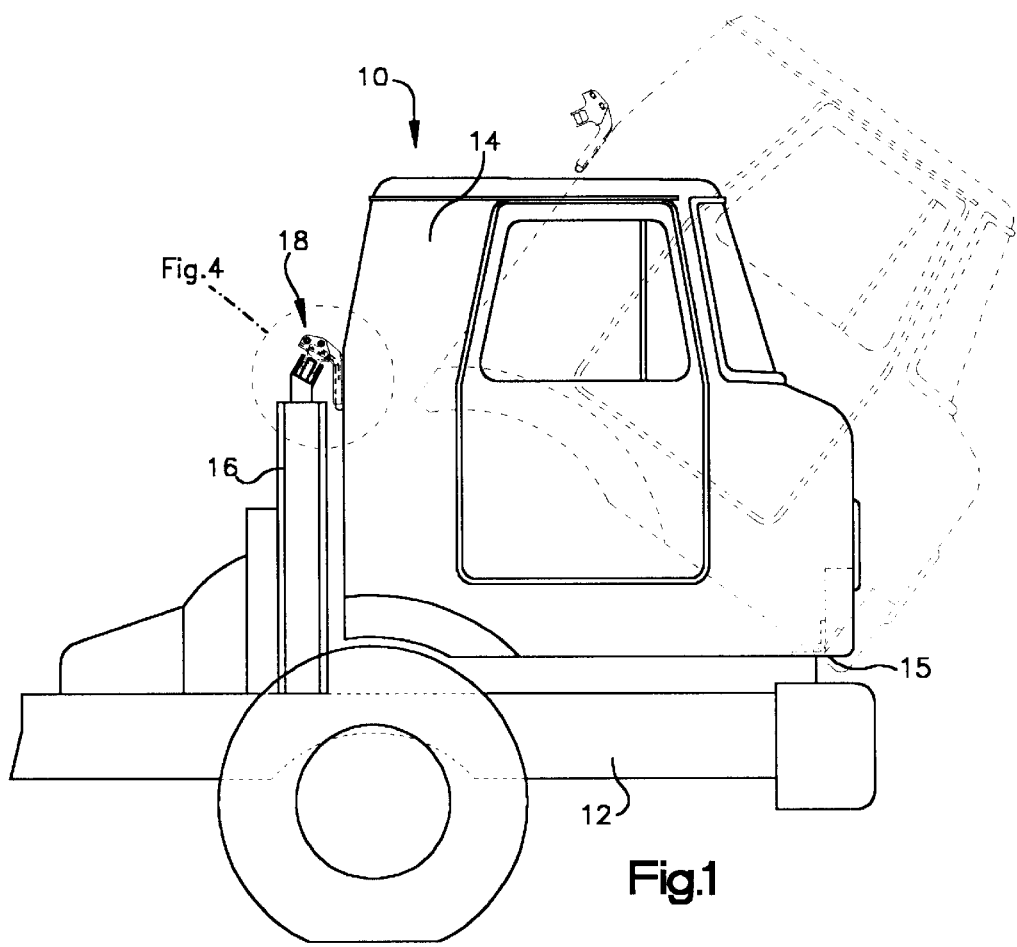
FIG. 1 is an elevational view of a forward portion of an over the highway vehicle of the tilt cab type showing the cab in its normal operating position in solid lines with a forwardly tilted position being shown in phantom.
Figure 6:
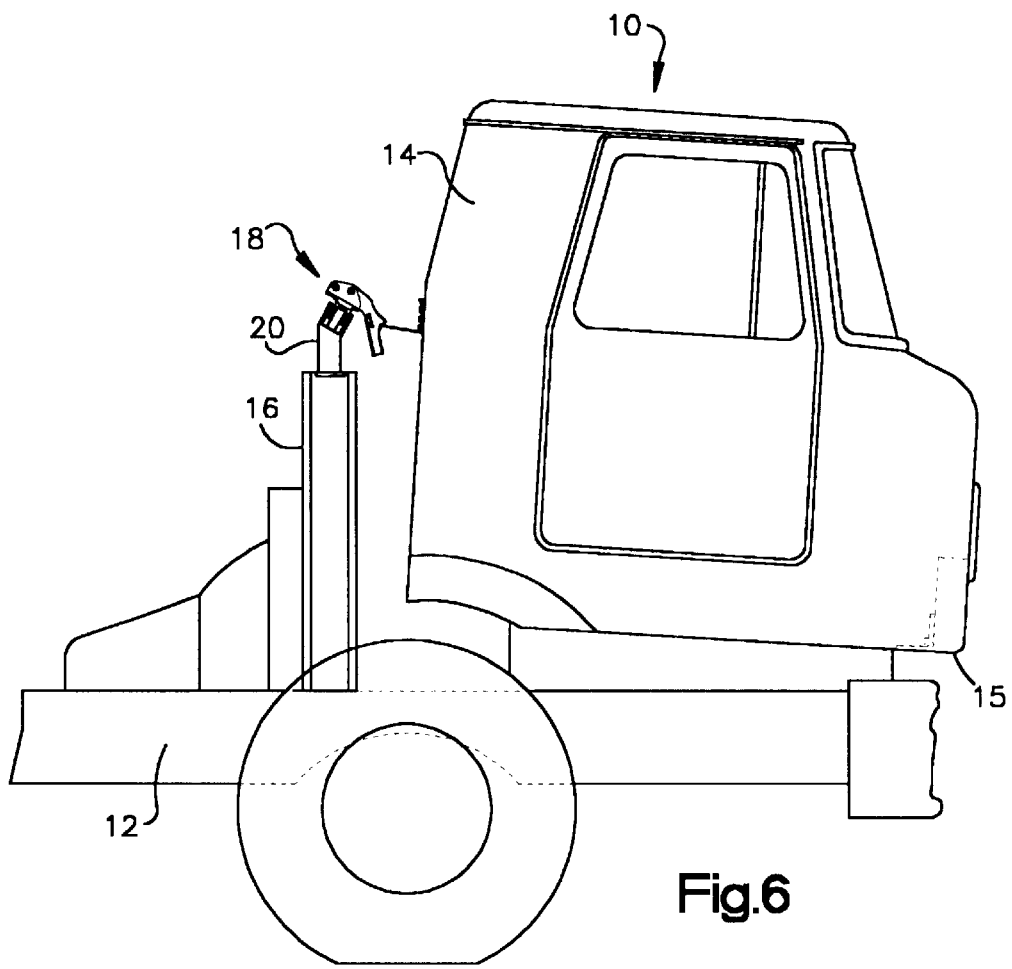
FIG. 6 is a view corresponding to FIG. 1 after the vehicle has absorbed impact forces and the catch subassembly has been distorted to the configuration of FIG. 5; and, FIG. 7 is an enlarged perspective view showing the catch subassembly after it has absorbed a collision force.

Referring to the drawings, an over the highway vehicle of the tilt cab type is shown generally at 10 in FIGS. 1 and 6. The depicted vehicle 10 is either a truck or tractor depending on what is mounted on a frame 12 in that portion of the vehicle not shown in the drawings. An operator cab 14 is mounted on the frame 12. The cab 14 is pivotably connected to the frame near a front of the vehicle at a location indicated by the reference numeral 15. The pivotal mounting of the cab is conventional and well known to those skilled in the art.

A latch post 16 is mounted on and fixed to the frame 12. A latch assembly 18 is mounted on the post 16 and connected to the cab 14. More specifically a latch subassembly 20 is fixed to the post 16 while a catch subassembly 22 is fixed to the cab as by bolts 24, FIGS. 2 and 7. The latch subassembly 20 is of a conventional well known construction in which a latch member 26 is moveable in response to operator applied forces selectively to connect and disconnect the latch member 26 to and from the catch member 28.

I. The Catch Subassembly 22

Referring in particular to FIGS. 2–7, the catch subassembly 22 includes a main mounting bracket 30. The main mounting bracket includes a U-shaped tongue 32. The tongue extends downwardly from a mounting portion of the bracket around a U-shaped bend and upwardly in parallel with the mounting portion.

A goose neck channel 34 is provided. An upper end portion 36 of the tongue is disposed within and welded to the goose neck channel 34. The goose neck channel has an integrally formed frangible bracket part 38. The bracket part 38 and the main bracket 30 are complementally shaped and fixed to a back section 40 of the cab 14 by the bolts 24.

A tongue limiter plate 42 is fixed to walls 44 of the goose neck channel 34. The tongue limiter plate functions to limit distortion of the tongue 32 and the goose neck channel 34 under the effects of collision produced forces.

Operation

In operation, the cab 14 is positioned in its solid line position of FIG. 1. The latch member 26 is manipulated to engage the catch member 28 as shown in FIGS. 1 and 4–6 to secure the latch member subassemblies 20, 22 together. When the latch member subassemblies are secured together, the cab 14 is locked in its upright and operational position.

Figures 2, 3:
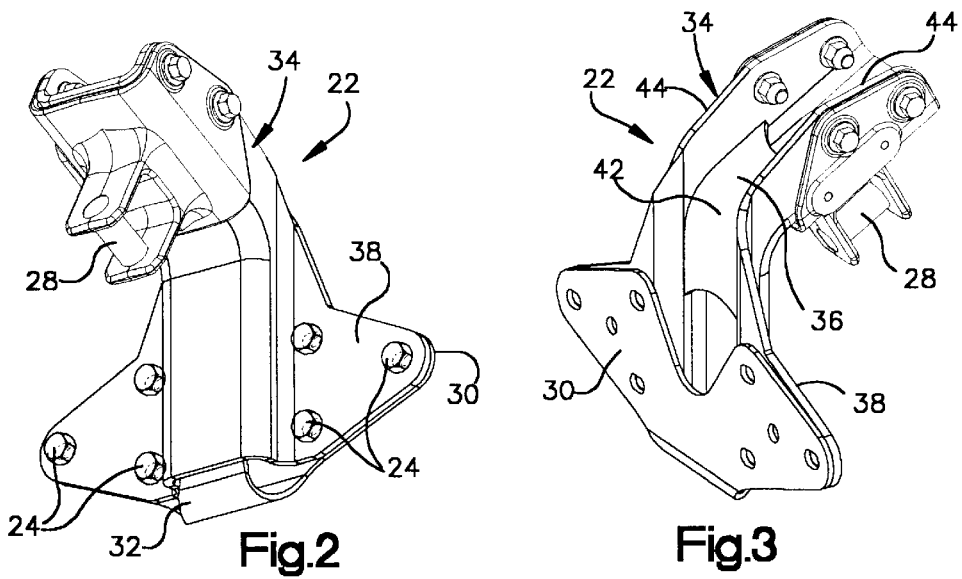
FIG. 2 is a front perspective view of the latch subassembly of the present invention on an enlarged scale with respect to FIG. 1.
FIG. 3 is a rearward perspective view of the latch subassembly of FIG. 2.
Figure 7:
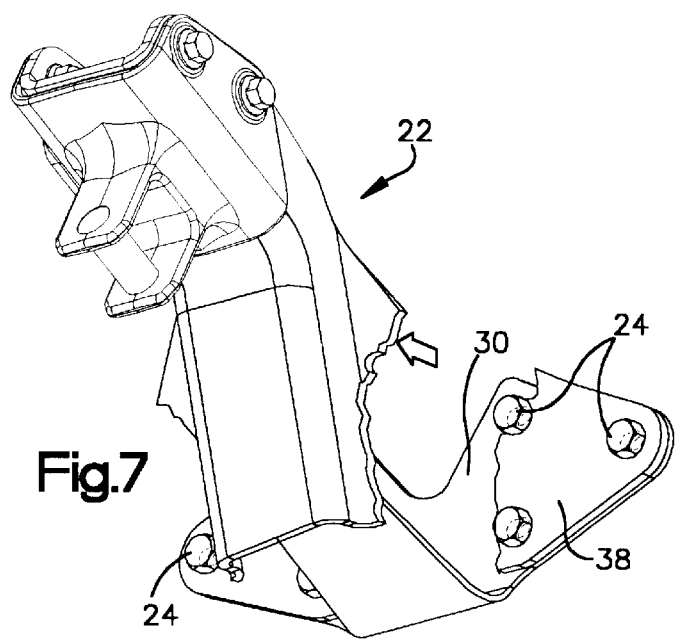

In the event that the vehicle experiences a collision, the catch member subassembly will move from a configuration depicted best in FIGS. 2–4 to the condition depicted in FIGS. 5–7. When a collision is experienced, which collision applies significant forces to the latch assembly, a main portion of the goose neck is broken away from the frangible bracket part 38 as depicted in FIGS. 5 and 7. Once the goose neck main portion as separated from the frangible bracket, the U-shaped tongue is stretched to the lineal condition best shown in FIG. 5.

The extent of the extension of the U-shaped tongue is limited by the limiter plate 42 as also best seen in FIG. 5. The limiter plate 42 also functions as a reinforcement between the goose neck walls 44. Thus, on impact the vehicle cab 14 can move from its operating position shown in FIG. 1 to a partially forwardly tilted position as shown in FIG. 6. While partially forwardly tilted, the cab is still securely fixed to the frame both at its forward pivot at 15 and through the latch post 16.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and scope of the invention as hereinafter claimed.

In the claims:

1. For use in an over the highway vehicle having a forwardly pivotal cab mounted on a frame and having a latch assembly interposed between the frame and the cab, the improved latch assembly comprising:

a) a latch subassembly including a latch;
   b) a co-acting subassembly including a catch for releasable retention of the latch;
   c) one of the subassemblies being connectable to such frame and the other of the subassemblies being connectable to such cab; and
   d) a first of the subassemblies including an impact absorbing yieldable element for normally maintaining a connected cab in a latched position, the element being extensible upon such vehicle experiencing a collision to allow controlled and limited forward tilting of such cab occasioned by the force of such a collision while maintaining such cab in a latched condition.

2. The assembly of claim 1 wherein the co-acting subassembly is a latch connected to the frame.

3. The assembly of claim 1 wherein the subassembly connected to the cab includes the yieldable element.

4. The assembly of claim 1 wherein the latch subassembly is said one subassembly.

5. In an over the highway vehicle of the tilt cab type, an improved latch assembly comprising:

a) a pair of subassemblies including coacting latching elements for releasably securing the subassemblies together;
   b) one of the subassemblies being connected to a rearward portion of the cab and the other of the subassemblies being connected to a vehicle frame;
   c) the subassemblies having an interconnected condition for maintaining the cab in an operating position, the interconnected condition being releasable to permit tilting of the cab to facilitate servicing of the vehicle;
   d) a first of the subassemblies including a force absorbing member for minimized cab damage in the event of a vehicle collision, the member including a U-shaped portion with arms respectively coupled to the frame and cab when the subassemblies are in the interconnected condition; and,
   e) the member having sufficient tensile strength to resist separation when stressed and having sufficient flexibility to yield and absorb collision induced forces.

6. The assembly of claim 5 wherein the subassembly connected to the cab includes the force-absorbing member.

7. The assembly of claim 6 wherein said first of the subassemblies also includes a mounting bracket having a component which is sufficiently frangible to fail under forces imparted by a vehicle collision.

8. The assembly of claim 5 wherein said first of the subassemblies also includes a mounting bracket having a component which is sufficiently frangible to fail under forces imparted by a vehicle collision.

9. The assembly of claim 8 wherein on collision impact, said component will fail thereby absorbing initial energy of impact and the force absorbing member will thereafter be straightened to absorb further forces while the assembly maintains a connection of such cab to a vehicle frame.

10. A latch assembly for use in connecting a tilt cab to a vehicle frame comprising:

a) a pair of subassemblies including a latch and a coacting catch;
    b) the subassemblies each including mounting sections, one of the mounting sections being for connection to such frame, the other of the sections being for connection to such cab; and,
    c) one of the subassemblies including a foreshortened force absorbing element adapted to be effectively lengthened upon application of a significant force tending to separate the subassemblies.

11. The assembly of claim 10 wherein the force absorbing element is an elongate metal element having a bend reducing the effective length of the elongate element, the bend being adapted to be straightened upon application of such significant force.

12. The assembly of claim 11 wherein the one subassembly further includes a frangible bracket.

13. The assembly of claim 10 wherein the one subassembly further includes a frangible bracket.

14. The assembly of claim 10 wherein said other mounting section is a portion of said one subassembly.

15. For use in a tilt cab vehicle a latch assembly comprising:
   a) a pair of subassemblies including a coacting catch and latch mechanism; and,
   b) one of the subassemblies including:
      i) a main mounting bracket including a mounting section and an integrally formed U-shaped tongue extending from the section with a part of the tongue in generally parallel relationship with the section;
      ii) a goose necked channel carrying a selected one of the latch and catch;
      iii) a frangible mounting bracket secured to the channel at a location spaced from said selected one;
      iv) an end portion of the tongue remote from the section being fixed to the channel at a location between said selected one and the brackets; and,
      v) the main and frangible brackets being juxtaposed with the frangible bracket interposed between the main bracket and said part.

16. The assembly of claim 15 wherein the catch is a part of said one subassembly.

17. The assembly of claim 16 wherein the other of the subassemblies includes a post and the latch is carried by the post.

18. The assembly of claim 15 wherein the other of the subassemblies includes a post and the latch is carried by the post.

19. The assembly of claim 18 wherein said one subassembly is adapted to be mounted on a vehicle cab and said other subassembly is adapted to be mounted on a vehicle frame.

20. The assembly of claim 15 wherein said one subassembly is adapted to be mounted on a vehicle cab and said other subassembly is adapted to be mounted on a vehicle frame.

21. A process of absorbing collision forces to minimize damage to a vehicle tilt cab upon occurrence of a collision, the process comprising:
   a) releasably coupling the cab to a vehicle chassis at a location remote from a pivotal connection of the cab to the chassis;
   b) allowing a supplemental bracket to be fractured by extension of a U-shaped tongue of a main bracket due to impact forces; and
   c) maintaining a connection between the cab and a latch mechanism as and after the tongue is extended whereby impact forces are absorbed and the coupling of the cab to the chassis is maintained.

* * * * *